United States Patent
Kim et al.

(10) Patent No.: US 10,294,360 B2
(45) Date of Patent: May 21, 2019

(54) POLYPROPYLENE RESIN COMPOSITION AND MOLDED PRODUCT THEREOF

(71) Applicants: HYUNDAI MOTOR COMPANY, Seoul (KR); KIA MOTORS CORPORATION, Seoul (KR); LG Hausys, Ltd., Seoul (KR); HYUNDAI EP CO., LTD., Dangjin-si, Chungcheongnam-do (KR)

(72) Inventors: Hyun Gyung Kim, Hwaseong-si (KR); Hee Joon Lee, Seoul (KR); Eun Seob Shin, Yongin-si (KR); Hyeok Lee, Suwon-si (KR); Ki Hyun Sung, Ulsan (KR); Chun Ho Park, Cheongju-si (KR)

(73) Assignees: Hyundai Motor Company, Seoul (KR); Kia Motors Corporation, Seoul (KR); LG Hausys, Ltd., Seoul (KR); Hyundai EP Co., Ltd., Seoul (KR)

( * ) Notice: Subject to any disclaimer, the term of this patent is extended or adjusted under 35 U.S.C. 154(b) by 0 days.

(21) Appl. No.: 15/843,921

(22) Filed: Dec. 15, 2017

(65) Prior Publication Data

US 2018/0258274 A1 Sep. 13, 2018

(30) Foreign Application Priority Data

Mar. 10, 2017 (KR) .......................... 10-2017-0030704

(51) Int. Cl.
*C08L 53/00* (2006.01)
*B60R 19/03* (2006.01)

(52) U.S. Cl.
CPC ............... *C08L 53/00* (2013.01); *B60R 19/03* (2013.01); *C08L 2205/025* (2013.01); *C08L 2205/035* (2013.01); *C08L 2207/04* (2013.01)

(58) Field of Classification Search
CPC ................. C08L 53/00; C08L 2207/04; C08L 2205/035; C08L 2205/025; B60R 19/03
See application file for complete search history.

(56) References Cited

U.S. PATENT DOCUMENTS 6,214,914 B1 * 4/2001 Evans ....................... C08F 8/30
524/323
6,319,991 B1 * 11/2001 Okayama .............. C08L 23/142
524/108

* cited by examiner

*Primary Examiner* — Robert D. Hartan
(74) *Attorney, Agent, or Firm* — Morgan, Lewis & Bockius LLP

(57) ABSTRACT

A polypropylene resin composition includes a base resin, a thermoplastic elastomer, and an inorganic filler. The base resin is a polypropylene-based mixed resin including a first resin, a second resin, a third resin, and a fourth resin. The first resin is a homopolypropylene resin. The second resin, the third resin, and the fourth resin are each a polypropylene-based block copolymer resin. A melt index of the second resin measured at a temperature of 230° C. and under a load of 2.16 kg is higher than a melt index of each of the third resin and the fourth resin measured under the same condition. A flexural modulus of the third resin measured in accordance with ASTM D790 is lower than a flexural modulus of the fourth resin measured under the same condition.

18 Claims, No Drawings

POLYPROPYLENE RESIN COMPOSITION AND MOLDED PRODUCT THEREOF

CROSS-REFERENCE TO RELATED APPLICATION

This application claims under 35 U.S.C. § 119(a) the benefit of Korean Patent Application No. 10-2017-0030704 filed Mar. 10, 2017, the entire contents of which are incorporated herein by reference.

BACKGROUND (a) Technical Field

The present disclosure relates to a polypropylene resin composition and a molded product thereof.

(b) Background Art

The reduction in weight of automobiles has recently become an issue which is not to be ignored, but needs to be essentially solved due to the environmental regulations, improvement in fuel efficiency, and the like. In the case of a bumper which has the highest weight among all automobile plastic parts, by making the thickness of an injection object small to reduce the weight, the reduction in weight may be achieved and the reduction in costs and the productivity may be improved. At this time, the thickness of an injection product may be decreased by adjusting the fluidity of a resin composition, but when the thickness of the injection product is small, mechanical properties deteriorate with the thickness reduction, and accordingly, there may occur problems in that the assembling workability on automobile production lines, the stability of the vehicle, and the safety of passengers in the vehicle in the case of an accident decreases. Thus, the rigidity and the like may be reinforced by using a highly rigid inorganic filler such as long fiber and carbon fiber, but in this case, there may occur a problem in that the appearance is not uniform and the dimensional stability deteriorates during molding.

When injection molding is performed, a plurality of periodic striped patterns called flow marks or tiger marks occur on the surface of an injection molded product in a direction crossing with the direction of flow. In particular, when a large molded product such as an automobile bumper is injection-molded, as the flow length is elongated, striped patterned appearance defects called flow marks easily occur near the end of the flow. When flow marks occurring on the surface of a molded product are conspicuous, the appearance of the molded product is damaged.

Therefore, in order to secure the stability and safety in the case of an accident while lowering energy consumption required for injection molding, there is a need for developing a material itself, which has high fluidity and rigidity for an ultra-thin film of a part, and does not generate flow marks.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

A preferred embodiment of the present disclosure provides a polypropylene resin composition which may impart an excellent physical property balance even when applied to a molded product having a small thickness, and may prevent flow marks from occurring while maintaining a low specific gravity.

In one aspect, the present disclosure provides a polypropylene resin composition including a base resin, a thermoplastic elastomer, and an inorganic filler, in which the base resin is a polypropylene-based mixed resin including a first resin, a second resin, a third resin, and a fourth resin, the first resin is a homopolypropylene resin, the second resin, the third resin, and the fourth resin are each a polypropylene-based block copolymer resin, a melt index of the second resin measured at a temperature of 230° C. and under a load of 2.16 kg is higher than a melt index of each of the third resin and the fourth resin measured under the same condition, and a flexural modulus of the third resin measured in accordance with ASTM D790 is lower than a flexural modulus of the fourth resin measured under the same condition.

In another aspect, the present disclosure provides a molded product including an injection object of the polypropylene resin composition.

The polypropylene resin composition may impart an excellent physical property balance such as imparting excellent rigidity, impact resistance, and dimensional stability even when applied to a molded product having a small thickness, while maintaining a low specific gravity. Further, it is possible to prevent flow marks from occurring together with excellent moldability.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The benefits and features of the present disclosure, and the methods of achieving the benefits and features will become apparent with reference to Examples to be described below. However, the present disclosure is not limited to Examples to be disclosed below, but may be implemented in various other forms, and the present Examples are only provided for rendering the disclosure of the present disclosure complete and for fully representing the scope of the disclosure to a person with ordinary skill in the art to which the present disclosure pertains, and the present disclosure will be defined only by the scope of the claims.

In one aspect, the present disclosure provides a polypropylene resin composition including a base resin, a thermoplastic elastomer, and an inorganic filler, in which the base resin is a polypropylene-based mixed resin including a first resin, a second resin, a third resin, and a fourth resin, the first resin is a homopolypropylene resin, the second resin, the third resin, and the fourth resin are each a polypropylene-based block copolymer resin, a melt index of the second resin measured at a temperature of 230° C. and under a load of 2.16 kg is higher than a melt index of each of the third resin and the fourth resin measured under the same condition, and a flexural modulus of the third resin measured in accordance with ASTM D790 is lower than a flexural modulus of the fourth resin measured under the same condition.

The polypropylene resin composition includes a base resin which is a polypropylene-based mixed resin of four different resins in addition to a thermoplastic elastomer and an inorganic filler, and thus may impart an excellent physical property balance such as imparting excellent rigidity, impact resistance, and dimensional stability even when applied to a molded product having a small thickness, while maintaining a low specific gravity. Further, it is possible to prevent flow marks from occurring together with excellent moldability.

The polypropylene resin composition includes a polypropylene-based mixed resin including a first resin, a second resin, a third resin, and a fourth resin as a base resin.

Specifically, the first resin is a homopolypropylene resin, and the second resin, the third resin, and the fourth resin are each a polypropylene-based block copolymer resin. For example, the second resin, the third resin, and the fourth resin may be each a copolymer of propylene and an α-olefin having 2 and 4 to 10 carbon atoms, respectively.

The base resin includes the homopolypropylene resin as a first resin, and thus may exhibit excellent heat resistance, and the base resin includes a second resin, a third resin, and a fourth resin, which are a polypropylene-based block copolymer resin, and thus may together impart excellent impact resistance.

The first resin may have a melt index of 1,200 g/10 min to 1,800 g/10 min measured at a temperature of 230° C. and under a load of 2.16 kg. The base resin includes a homopolypropylene resin having a high melt index within the range together with a second resin, a third resin, and a fourth resin to be described below, and thus may impart excellent moldability by increasing the total melt index of the polypropylene resin composition, and may prevent flow marks from occurring. And, it is possible to impart an excellent physical property balance such as imparting excellent rigidity, impact resistance, and dimensional stability even when the polypropylene resin composition is applied to a molded product having a small thickness, and it is possible to prevent flow marks from occurring.

The first resin may have a weight average molecular weight of about 140,000 g/mol to about 160,000 g/mol. The base resin includes a homopolypropylene resin having a weight average molecular weight within the range together with a second resin, a third resin, and a fourth resin to be described below, and thus may impart an excellent physical property balance by adjusting physical properties such as fluidity and rigidity of a polypropylene resin composition including the base resin, and may prevent flow marks from occurring.

The base resin includes a second resin having a melt index measured at a temperature of 230° C. and under a load of 2.16 kg higher than a melt index of each of the third resin and the fourth resin, which is measured under the same condition.

Specifically, the second resin may have a melt index of about 80 g/10 min to about 120 g/10 min measured at a temperature of 230° C. and under a load of 2.16 kg. In contrast, the third resin and the fourth resin may have a melt index of about 20 g/10 min to about 50 g/10 min measured at a temperature of 230° C. and under a load of 2.16 kg.

The base resin includes a second resin having a melt index within the range, a homopolypropylene resin having a higher melt index than the second resin, and a third resin and a fourth resin, which are a polypropylene-based block copolymer resin having a slightly lower melt index, and thus may impart excellent moldability by appropriately adjusting the total melt index of the polypropylene resin composition, and may prevent flow marks from occurring.

The base resin includes a second resin having an isotactic index in a range from about 97% to about 99.5% measured by $^{13}$C-NMR, and thus has high crystallinity and may impart excellent mechanical properties.

The base resin includes a third resin having a flexural modulus measured in accordance with ASTM D790, which is lower than a flexural modulus of a fourth resin measured under the same condition.

Both the third resin and the fourth resin are a polypropylene-based block copolymer resin. Meanwhile, the third resin is copolymerized by using propylene and an α-olefin having 2 and 4 to 10 carbon atoms, respectively, as a specific catalyst, and may have a chemical structure completely different from that of the fourth resin. The third resin and the fourth resin, which have completely different chemical structures, have different mechanical properties and flow patterns, and thus may prevent flow marks from occurring together with an excellent physical property balance such as excellent rigidity and impact resistance to a composition including the third resin and the fourth resin. Specifically, the third resin may have a melt index of about 20 g/10 min to about 50 g/10 min measured at a temperature of 230° C. and under a load of 2.16 kg. The third resin has a low melt index as described above unlike the first resin and the second resin, but has a peculiar chemical structure, does not degrade moldability, and may prevent flow marks from occurring.

The third resin may have a flexural modulus of about 1,000 kg/cm$^2$ to about 1,300 kg/cm$^2$ measured in accordance with ASTM D790, and the fourth resin may have a flexural modulus of about 1,400 kg/cm$^2$ to about 1,600 kg/cm$^2$ measured in accordance with ASTM D790. That is, the flexural modulus of the third resin is lower than that of the fourth resin.

A tensile strength of the third resin measured in accordance with ASTM D638 may be lower than that of the fourth resin measured in accordance with ASTM D638.

Specifically, the third resin may have a tensile strength of less than about 300 kg/cm$^2$ measured in accordance with ASTM D638. For example, the third resin may have a tensile strength of about 260 kg/cm$^2$ to about 280 kg/cm$^2$. The fourth resin may have a tensile strength of about 290 kg/cm$^2$ to about 310 kg/cm$^2$ measured in accordance with ASTM D638.

The third resin and the fourth resin have excellent mechanical properties and good moldability by having a polydispersity index (weight average molecular weight/number average molecular weight) of about 4 to about 5, and thus may impart excellent processing effects.

The polypropylene resin composition may include the base resin in an amount of about 55 wt % to about 65 wt %. When the content of the base resin is less than the range, mechanical properties such as flexural modulus and tensile strength may deteriorate, and when the content is more than the range, the impact strength, and the like may deteriorate.

The polypropylene resin composition includes a thermoplastic elastomer, and thus may impart excellent impact strength, heat resistance, and dimensional stability, and may exhibit excellent injection moldability.

The thermoplastic elastomer may include one selected from the group consisting of an ethylene-based copolymer, a styrene-based copolymer, and a combination thereof. The ethylene-based copolymer may be a copolymer of ethylene and an α-olefin having 4 to 10 carbon atoms. The α-olefin having 4 to 10 carbon atoms may be one α-olefin compound selected from the group consisting of 1-butene, 1-pentene, 4-methyl-1-pentene, 1-hexene, 1-heptene, 1-octene, 1-decene, and a combination thereof. For example, the thermoplastic elastomer may be an ethylene-octene olefin. The styrene-based copolymer may be one copolymer selected from the group consisting of a styrene-ethylene copolymer, a styrene-butylene copolymer, a styrene-ethylene-propylene copolymer, a styrene-isoprene-styrene copolymer, a styrene-butylene-styrene copolymer, a styrene-ethylene-butylene-styrene copolymer, a styrene-ethylene-propylene-styrene copolymer, a styrene-ethylene-ethylene-propylene-styrene copolymer, and a combination thereof. For example, the styrene-based copolymer may be a block copolymer.

The thermoplastic elastomer may have a Mooney viscosity of about 5 ML1+4 to about 50 ML1+4 measured at 121° C. in accordance with ASTM-D1646. When the Mooney viscosity of the thermoplastic elastomer is less than the range, the dimensional stability, low-temperature impact characteristics, and the like may deteriorate, and when the Mooney viscosity is more than the range, mechanical properties such as impact strength may deteriorate, and flow marks may be easily produced.

The thermoplastic elastomer may have a glass transition temperature in a range from about −60° C. to about −45° C. The thermoplastic elastomer may impart a suitable elongation to a molded product including the thermoplastic elastomer and may exhibit excellent moldability by having a glass transition temperature within the range.

The thermoplastic elastomer may be included in a content of about 22 parts by weight to about 42 parts by weight based on 100 parts by weight of the base resin. Specifically, when the content of the thermoplastic elastomer is less than the range, the impact strength may deteriorate, and when the content is more than the range, the ductility is reinforced, and as a result, mechanical properties such as flexural modulus may deteriorate, and accordingly, it may be difficult for the thermoplastic elastomer to be used as a part for an automobile.

The polypropylene resin composition has excellent dispersibility by including an inorganic filler having an average diameter of about 1 μm to about 6 μm, and may impart an improved mechanical rigidity in a small content due to a large surface area, and accordingly, may impart a reduction in weight. Furthermore, dimensional stability may be imparted. Specifically, when the average diameter of the inorganic filler is less than the range, the surface area is so large that there is a problem with compatibility of the inorganic filler with the base resin, and the rigidity may be decreased. Further, when the average diameter of the inorganic filler is more than the range, the impact strength deteriorates, so that when the inorganic filler is applied to a molded product having a small thickness, the molded product is broken, and as a result, physical properties are decreased, or the appearance may be deformed.

The inorganic filler may be one selected from the group consisting of talc, mica, whisker, barium sulfate, calcium carbonate, glass bubble, and a combination thereof.

The inorganic filler may be included in a content of about 22 parts by weight to about 32 parts by weight based on 100 parts by weight of the base resin. Specifically, when the content of the inorganic filler is less than the range, improved mechanical properties fail to be exhibited, and when the content is more than the range, processability and appearance characteristics of a polypropylene resin composition may be decreased.

The polypropylene resin composition may impart an excellent physical property balance such as imparting excellent rigidity, impact resistance, and dimensional stability even when applied to a molded product having a small thickness, while maintaining a low specific gravity, by appropriately mixing a base resin, which is a polypropylene-based mixed resin including the first resin, the second resin, the third resin, and the fourth resin, the thermoplastic elastomer, and the inorganic filler. Further, it is possible to prevent flow marks from occurring together with excellent moldability.

The polypropylene resin composition may further include one additive selected from the group consisting of an antioxidant, a UV absorbent, a nucleating agent, a coupling agent, a dispersant, a light stabilizer, a processed lubricant, an inorganic pigment, and a combination thereof.

An antioxidant may be one selected from the group consisting of a phenol-based antioxidant, a phosphite-based antioxidant, thiodipropionate, and a combination thereof.

A UV absorbent is included in a polypropylene resin composition, and thus has characteristics of preventing a change in physical properties of a polymer and appearance, for example, aging by blocking or absorbing UV rays which decompose polymer chains, and the UV absorbent may be one selected from the group consisting of hydroxyl benzophenone, benzotriazoles, and a combination thereof.

A nucleating agent is included in a polypropylene resin composition, and thus has characteristics of increasing the stiffness by increasing and micronizing the crystal region of polymer chains, and the nucleating agent may be one selected from the group consisting of carbonate salt, a phosphate-based nucleating agent, a sorbitol derivative, and a combination thereof.

A coupling agent improves compatibility of the inorganic filler with the resin included in the polypropylene resin composition, and may impart excellent mechanical rigidity and impact resistance and may simultaneously impart dimensional stability by increasing the compatibility to improve the dispersibility.

Specifically, the coupling agent is a modified polypropylene resin including a reactive group having reactivity with an inorganic filler at the main chain or ends of polypropylene, and examples of the reactive group include maleic acid, anhydrous maleic acid, carboxylic acid, a hydroxyl group, vinyl acetate, glycidyl methacrylate, vinyl oxazoline, acrylic acid, and the like.

A dispersant is included in a polypropylene resin composition, and thus has characteristics of improving molding processability by degrading the melt viscosity, and reducing the degradation because the processing time and the processing temperature are decreased. The dispersant may be one selected from the group consisting of a dynamic lubricity, a static lubricity, and a combination thereof.

A light stabilizer is included in a polypropylene resin composition, and thus has characteristics of preventing a degradation reaction of a polymer by light, and the light stabilizer may be one selected from the group consisting of an organic nickel-based light stabilizer, a hindered piperidine-based light stabilizer, and a combination thereof.

An inorganic pigment may be included in a polypropylene resin composition, and the inorganic pigment may be one selected from the group consisting of mica, carbon black, and a combination thereof.

In another aspect, the present disclosure provides a molded product including an injection object of the polypropylene resin composition. The molded product includes an injection object of the above-described polypropylene resin composition, and may impart an excellent physical property balance such as imparting excellent rigidity, impact resistance, and dimensional stability even when applied to a molded product having a small thickness, while maintaining a low specific gravity. Further, flow marks may not occur together with excellent moldability.

The matters on the polypropylene resin composition are the same as those described above.

The molded product may be used for use of an automobile exterior material, such as a bumper, a side sill molding, a door trim spoiler, a side visor, a cowl vent grille, a radiator grille, a side molding, and an end panel garnish.

Specifically, the molded product has a small thickness, and thus may further reduce the weight and may simultaneously have an excellent physical property balance such as excellent mechanical rigidity and impact resistance, and may have excellent appearance because flow marks do not occur. For example, the molded product may exhibit excellent mechanical strength and impact resistance even in a thickness of less than about 2.5 mm. The molded product may have a thickness of about 2.0 mm to about 2.2 mm. Accordingly, the molded product may be suitable for being used as an exterior material for an automobile, such as a bumper.

Hereinafter, specific examples of the present disclosure will be suggested. However, the examples described below are only provided for specifically exemplifying or explaining the present disclosure, and the present disclosure is not limited thereby.

EXAMPLES

The following examples illustrate the disclosed features and are not intended to limit the same.

Example 1

A polypropylene resin composition including: a base resin including a first resin being a homopolypropylene resin having a melt index of 1,800 g/10 min measured at a temperature of 230° C. and under a load of 2.16 kg, a second resin being an ethylene-propylene block copolymer resin having a melt index of 100 g/10 min measured at a temperature of 230° C. and under a load of 2.16 kg and an isotactic index of 97% to 99.5% measured by $^{13}C$-NMR, a third resin being an ethylene-propyl block copolymer resin having a melt index of 30 g/10 min measured at a temperature of 230° C. and under a load of 2.16 kg, a flexural modulus of 1,200 kg/cm$^2$ measured in accordance with ASTM D790, and a tensile strength of 270 kg/cm$^2$ measured in accordance with ASTM D638, and a fourth resin being an ethylene-propylene block copolymer resin having a melt index of 30 g/10 min measured at a temperature of 230° C. and under a load of 2.16 kg, a flexural modulus of 1,500 kg/cm$^2$ measured in accordance with ASTM D790, and a tensile strength of 300 kg/cm$^2$ measured in accordance with ASTM D638; ethylene-octene olefin as a thermoplastic elastomer; and a plate-like talc having an average diameter in a range from about 1 μm to about 6 μm was prepared.

At this time, the first resin: the second resin: the third resin: the fourth resin: the thermoplastic elastomer; and the talc were mixed at a wt % of about 10:35:10: 7:19:17.

The polypropylene resin composition was stirred under a condition in a range from about 250 rpm to about 350 rpm in a temperature interval in a range from about 190° C. to about 210° C. by using a twin screw extruder having a diameter of 40 mm and a value of L/D of 52, and a sample was molded by using an injection molding apparatus.

Comparative Example 1

A polypropylene resin composition was prepared in the same manner as in Example 1, except that the base resin excluded a first resin and a third resin, and included only a second resin, and a fourth resin, the second resin:the fourth resin:a thermoplastic elastomer:talc were mixed at a wt % of about 45:23:15:15, and at this time, the talc had an average diameter in a range from about 7 μm to about 12 μm.

Comparative Example 2

A polypropylene resin composition was prepared in the same manner as in Comparative Example 1, except that the base resin excluded a third resin, and included only a first resin, a second resin, and a fourth resin, and the first resin:the second resin:the fourth resin:a thermoplastic elastomer:talc were mixed at a wt % of about 10:35:23:15:15.

Comparative Example 3

A polypropylene resin composition was prepared in the same manner as in Comparative Example 1, except that the base resin excluded a fourth resin, and included only a first resin, a second resin, and a third resin, and the first resin:the second resin:the third resin:a thermoplastic elastomer:talc were mixed at a wt % of about 10:35:23:15:15.

TABLE 1

|  | Example 1 | Comparative Example 1 | Comparative Example 2 | Comparative Example 3 |
| --- | --- | --- | --- | --- |
| First resin | 10 | — | 10 | 10 |
| Second resin | 35 | 45 | 35 | 35 |
| Third resin | 10 | — | — | 23 |
| Fourth resin | 7 | 23 | 23 | — |
| Ethylene-octene olefin | 19 | 15 | 15 | 15 |
| Ethylene-butene olefin | — | — | — | — |
| Talc (1 μm to 6 μm) | 17 | — | — | — |
| Talc (7 μm to 12 μm) | — | 15 | 15 | 15 |

TEST EXAMPLES

<Evaluation>

Test Example 1

Melt Index (g/10 Min)

The melt indices of the polypropylene resin compositions obtained in the Examples and the Comparative Examples were measured at 230° C. and under a load of 2.16 kg in accordance with ASTM D1238 method, and the results are shown in [Table 2].

Test Example 2

Specific Gravity (g/Cm³)

The specific gravities of the samples obtained in the Examples and the Comparative Examples were measured in accordance with ASTM D792, and the results are shown in [Table 2].

Test Example 3

Elongation (%)

The elongations of the samples obtained in the Examples and the Comparative Examples were measured at a temperature of 23° C. in accordance with ASTM D638, and the results are shown in [Table 2].

Test Example 4

Tensile Strength (MPa)

The tensile strengths of the samples prepared in the Examples and the Comparative Examples were measured by setting a sample having a size of 165×13 ×3.2 mm at a crosshead speed of 50 mm/min using ASTM D638 at 23° C., and the results are shown in [Table 2].

Test Example 5

Flexural Strength (MPa)

The flexural moduli of the samples prepared in the Examples and the Comparative Examples were measured by setting a sample having a size of 12.7×127×6.4 mm at a crosshead speed of 10 mm/min using ASTM D790, and the results are shown in [Table 2].

Test Example 6

IZOD Impact Strength (J/m)

The IZOD impact strengths of the samples having a size of 63.5×12.7×6.4 mm prepared in the Examples and the Comparative Examples were measured at room temperature (23° C.) and a low temperature (−30° C.) in accordance with ASTM D256, and the results are shown in [Table 2].

Test Example 7

Heat Distortion Temperature (° C.)

The heat distortion temperatures of the samples having a thickness of 6.4 mm prepared in the Examples and the Comparative Examples were measured by applying a surface pressure of 0.45 MPa using ASTM D648, and the results are shown in [Table 2].

Test Example 8

Flow Mark

It was observed by the unaided eye whether flow marks occurred in the samples prepared in the Examples and the Comparative Examples, the samples were determined based on the following criteria, and the results are shown in [Table 2].

X: the case where there are few flow marks

O: the case where flow marks are significantly observed, there is a problem with practical use, and the molded product is defective.

TABLE 2

|  | Example 1 | Comparative Example 1 | Comparative Example 2 | Comparative Example 3 |
|---|---|---|---|---|
| Melt index | 41.3 | 33.6 | 43.0 | 42.7 |
| Specific gravity | 1.01 | 1.00 | 1.00 | 1.00 |
| Elongation | 210 | 273 | 167 | 221 |
| Tensile strength | 22.7 | 20.2 | 22.5 | 20.5 |
| Flexural modulus | 2515 | 2120 | 2431 | 2180 |
| IZOD Impact strength (room temperature) | 355 | 258 | 207 | 221 |
| IZOD Impact strength (low temperature) | 61.1 | 51.2 | 46.4 | 47.2 |
| Heat distortion temperature | 123.9 | 120.9 | 123.4 | 120.6 |
| Flow marks | X | O | O | X |

As shown in Table 2, it can be seen that Example 1 has an excellent physical property balance such as excellent rigidity, impact resistance, and excellent dimensional stability, while maintaining a low specific gravity, and does not generate flow marks. In particular, it was confirmed that the Example 1 had significantly improved effects in terms of flexural modulus and impact strength.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. polypropylene resin composition comprising:
   a base resin,
   a thermoplastic elastomer, and
   an inorganic filler,
   wherein the base resin is a polypropylene-based mixed resin comprising a first resin, a second resin, a third resin, and a fourth resin,
   the first resin is a homopolypropylene resin,
   the second resin, the third resin, and the fourth resin are each a polypropylene-based block copolymer resin,
   a melt index of the second resin measured at a temperature of 230 ° C. and under a load of 2.16 kg is higher than a melt index of each of the third resin and the fourth resin measured under the same condition,
   a flexural modulus of the third resin measured in accordance with ASTM D790 is lower than a flexural modulus of the fourth resin measured under the same condition, and the third resin has a flexural modulus of about 1,000 kg/cm² to about 1,300 kg/cm², and the fourth resin has a flexural modulus of about 1,400 kg/cm² to about 1,600 kg/cm², measured in accordance with ASTM D790.

2. The polypropylene resin composition of claim 1, wherein the second resin, the third resin, and the fourth resin are each a copolymer of propylene and an α-olefin having 2 and 4 to 10 carbon atoms, respectively.

3. The polypropylene resin composition of claim 1, wherein the second resin has an isotactic index in a range from 97% to 99.5% measured by $^{13}$C-NMR.

4. The polypropylene resin composition of claim 1, wherein the first resin has a weight average molecular weight in a range from 140,000 g/mol to 160,000 g/mol.

5. The polypropylene resin composition of claim 1, wherein a tensile strength of the third resin measured in accordance with ASTM D638 is lower than that of the fourth resin measured in accordance with ASTM D638.

6. The polypropylene resin composition of claim 5, wherein the third resin has a tensile strength of less than 300 kg/cm² measured in accordance with ASTM D638.

7. The polypropylene resin composition of claim 1, wherein the polypropylene resin composition comprises the base resin in an amount in a range from 55 wt % to 65 wt %.

8. The polypropylene resin composition of claim 1, wherein the thermoplastic elastomer comprises one selected from the group consisting of an ethylene-based copolymer, a styrene-based copolymer, and a combination thereof.

9. The polypropylene resin composition of claim 8, wherein the ethylene-based copolymer is a copolymer of ethylene and an α-olefin having 4 to 10 carbon atoms.

10. The polypropylene resin composition of claim 1, wherein the thermoplastic elastomer has a Mooney viscosity in a range from 5 ML1+4 to 50 ML1+4 measured at 121 ° C. in accordance with ASTM-D1646.

11. The polypropylene resin composition of claim 1, wherein the thermoplastic elastomer has a glass transition temperature in a range from −60° C. to −45° C.

12. The polypropylene resin composition of claim 1, wherein the thermoplastic elastomer is comprised in an amount of 22 parts by weight to 42 parts by weight based on 100 parts by weight of the base resin.

13. The polypropylene resin composition of claim 1, wherein the inorganic filler is one selected from the group consisting of talc, mica, whisker, barium sulfate, calcium carbonate, glass bubble, and a combination thereof.

14. The polypropylene resin composition of claim 1, wherein the inorganic filler has an average diameter in a range from 1 μm to 6 μm.

15. The polypropylene resin composition of claim 1, wherein the inorganic filler is comprised in an amount in a range from 22 parts by weight to 32 parts by weight based on 100 parts by weight of the base resin.

16. The polypropylene resin composition of claim 1, further comprising one additive selected from the group consisting of an antioxidant, a UV absorbent, a nucleating agent, a coupling agent, a dispersant, a light stabilizer, a processed lubricant, an inorganic pigment, and a combination thereof.

17. A molded product comprising an injection object of the polypropylene resin composition according to claim 1.

18. The molded product of claim 17, wherein the molded product has a use as an exterior material for an automobile.

* * * * *